(12) United States Patent
Singhal

(10) Patent No.: US 8,103,246 B2
(45) Date of Patent: Jan. 24, 2012

(54) SYSTEMS AND METHODS FOR REMOTE USER AUTHENTICATION

(76) Inventor: Tara Chand Singhal, Torrance, CA (US)

( * ) Notice: Subject to any disclaimer, the term of this patent is extended or adjusted under 35 U.S.C. 154(b) by 1079 days.

(21) Appl. No.: 11/455,137

(22) Filed: Aug. 25, 2006

(65) Prior Publication Data

US 2007/0016796 A1    Jan. 18, 2007

Related U.S. Application Data

(62) Division of application No. 10/217,287, filed on Aug. 12, 2002, now abandoned.

(51) Int. Cl.
*H04M 1/66* (2006.01)
(52) U.S. Cl. ........ 455/411; 713/164; 713/155; 713/178; 713/171; 713/184; 455/422.1; 455/435.1; 455/456.1; 455/442
(58) Field of Classification Search ................. 726/6
See application file for complete search history.

(56) References Cited

U.S. PATENT DOCUMENTS 6,993,658 B1 * 1/2006 Engberg et al. ............... 713/185
7,444,669 B1 * 10/2008 Bahl et al. ........................ 726/3
* cited by examiner

*Primary Examiner* — Charles Appiah
*Assistant Examiner* — Randy Peaches
(74) *Attorney, Agent, or Firm* — Steve Roeder Esq.

(57) ABSTRACT

Systems for methods for remote user authentication by using a cellular phone and an authentication system that generates and uses transient pass codes. The Authentication system is used to store a user's existing passwords; alternatively, the authentication system creates on demand a transient random pass code that is good for a limited duration. The transient pass codes may also be used in the packets that enable each packet to be individually authenticated in the firewall. When the user has forgotten the password in a traditional system, alternatively, without the need to create or remember passwords, user can use transient pass codes. The user retrieves the password or the pass code via a cell telephone call to the authentication system, before logging on to the system.

14 Claims, 6 Drawing Sheets

Account Open/Access Web page 400

Cell Tel number _____ 350
Name _____ 352
E-mail _____ 354
PIN _____ 356

System Data Web Page 410

| System Name 366 | Password 364 |
|---|---|
| Bank | Argol20 |
| Shopping | Colata12 |
| Business | Biz2000 |

System Selection Web Page 420

Select system, Enter system user id and Time 420

| System ID 358 | Selection 422 | System Name 366 | | User ID 360 | Time 362 |
|---|---|---|---|---|---|
| 1. | X 1 | Bank Acme | 414A | Shimkin120 | 30 sec. |
| 2. | | Shop Amaze | | | |
| 3. | X 2 | DMV | 414B | Root400 | 60 sec. |
| 4. | X 3 | Shop NWRK | 414C | AOL1999 | 1 day |
| 5. | | SSADMIN | | | |
| 6. | | Business ABC | | | |

Figure 4

SYSTEMS AND METHODS FOR REMOTE USER AUTHENTICATION

CROSS REFERENCE TO RELATED APPLICATIONS

This application is a divisional application of U.S. patent application Ser. No. 10/217,287 filed Aug. 12, 2002 now abandoned, titled "Method and Apparatus for User Authentication Using a Cellular Telephone and A Transient Pass Code", of Tara Chand Singhal. This application claims priority on the application Ser. No. 10/217,287 and is incorporated herein by reference.

BACKGROUND

Access to a computer system is controlled by a combination of a user ID to identify a user and a password to verify the user. The password is initially created by the system and then can be changed by the user. It is only known to the user and is kept secure by an access control function within the computer system.

The combination of a user ID and password are the prevalent technology for access control to computer systems and are used in: (i) government agencies such as defense systems by defense employees to control access to classified data, (ii) business systems by employees of the business to control access to sensitive data, (iii) consumer systems by consumers to control access to consumer services and resources provided by a business, and (iv) banking systems to control access to online account data and so on.

The use of a password to control access suffers from some deficiencies, such as, too many passwords, easy to forget and unfamiliar difficult to remember long string passwords, and risk of compromise.

There have been many solutions to address one or more of these deficiencies. Some of them have been: 1) having longer passwords of at least 6 to 8 characters, where the password must have a combination of numerals and alphabets, 2) having password that have a combination of lower and upper case letters as well as a punctuation character, also referred to a pass phrase 3) having two layers of passwords common in defense systems 4) having the password changed periodically such as once a month or every three months, which is common in defense and sensitive business systems, 5) supplying additional personal data such as mother's name, place of birth or other data to the computer system when a password is forgotten, so that such data may be used to verify the user in lieu of a forgotten password.

New innovative solutions to address these deficiencies in password technology are also being researched. One example is a recent news report on Microsoft, which describes a research effort on creating and using a password that depends upon a user selecting points on a picture. The pixel location sequence is to be used as a password, as it is believed that points on a picture are easy to remember and also create a complex password.

Other solutions have been biometrics, such as the use of one's fingerprint, handprint, or retina-scan, to control access to a facility controlled by a computer system. Based on published stories, use of biometrics, have problems such as, having finger print can be easily fooled by an imposter gluing on some-one else's finger print on his fingers, and that people are hesitant to make biometric data available to computer systems for privacy reasons.

Smart cards are also being used in some cases to control access to a computer system. Use of smart cards or tokens require a smart card reader and a smart card being given to a person in advance. For these and other reasons they have not gained wide spread popularity.

In light of the above, it is an objective of the present invention to have a user authentication system that eliminates the problems of: (i) the users in having to create and remember passwords, in having to create different passwords for access to different systems, and passwords being stolen from the users by their carelessness or negligence; and (ii) the businesses in having to maintain computer systems that have a risk of compromise of password by carelessness of their employees or external hacker attacks.

SUMMARY

The present invention is directed to a method and apparatus for a user authentication system that uses a cellular telephone. In one embodiment, an authentication system is used to store a user's existing passwords. When the user has forgotten the password, the user can retrieve it via an 800 number call to the authentication system using his/her cell telephone, before logging on to the system. The current caller ID technology provided by the telephone companies uniquely identifies a cell phone owner and is used to verify the caller to the authentication system.

In another embodiment, the authentication system does not store existing passwords, but creates, on demand, a temporary or transient random pass code that is good for a limited time. Such transient pass codes are randomly created only at the instance of use. They do not exist earlier anywhere. They can be very simple, for example a 3-digit numeral, and are believed to be far more secure in their operation and use than the current use of passwords.

The user has only a set time to gain access to the computer system using the user ID and the transient pass code. The set time may be selected based on user's preference and the security needs of the system.

This invention may be practiced in different versions, as the systems have different security needs and the users have different habits. These are described in the description section.

The authentication system of this invention serves (i) the users, by the users not having to create and or remember passwords, and (ii) the businesses by eliminating the risk of having passwords compromised by carelessness or negligence of users or employees and of being a target for hackers.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which:

FIG. 4 is a version of web pages that illustrates user access to the authentication system.

DESCRIPTION

Introduction

In this specification, the terminology pass code and password is used interchangeably. However, where it is necessary to distinguish, the term password is used for an existing password and pass code is used for those passwords that are created on demand for an instance of use according to this invention.

Figure 1A:
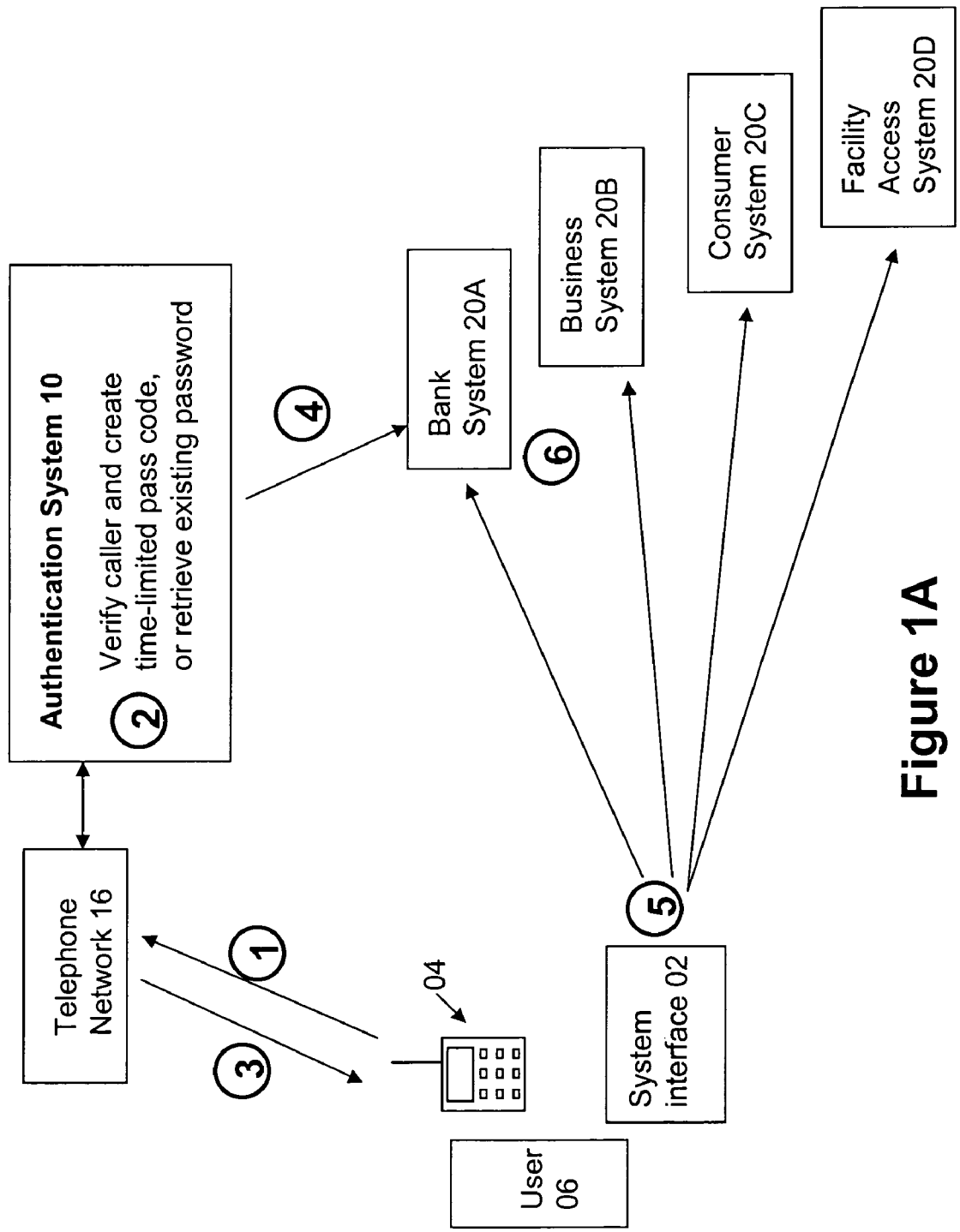
FIG. 1A is a block diagram that illustrates a version of the current invention.

With initial reference to FIG. 1A, authentication system 10, interfaces with a user 06 via a cellular telephone 04 and telephone network 16. The user has access to the system 20A-D via a system interface 02. The system 20A-D may be a bank system 20A, a business system 20B, a consumer system 20C or a facility access system 20D.

Figure 2:
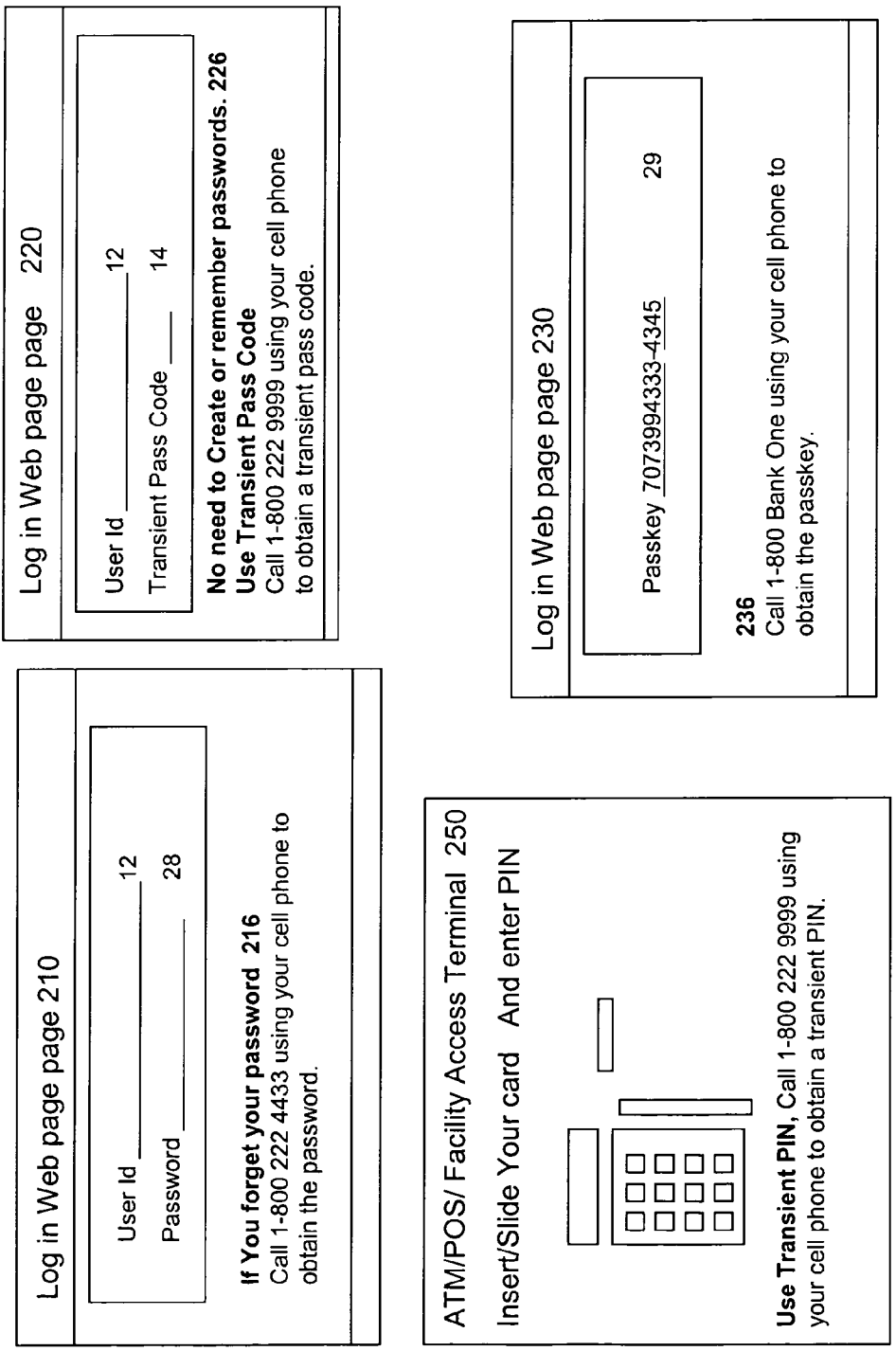
FIG. 2 illustrates system interfaces.

As illustrated in FIG. 2, the system interface 02 may be a log in web page 210, 220, 230 or it may be an ATM/POS/Facility Access terminal 250.

As illustrated in FIG. 1A, the authentication system 10 may be deployed as a stand-alone system, where it may store and allow the user to retrieve passwords of multiple number of systems 20A-D where user maintains accounts.

Figure 1B:
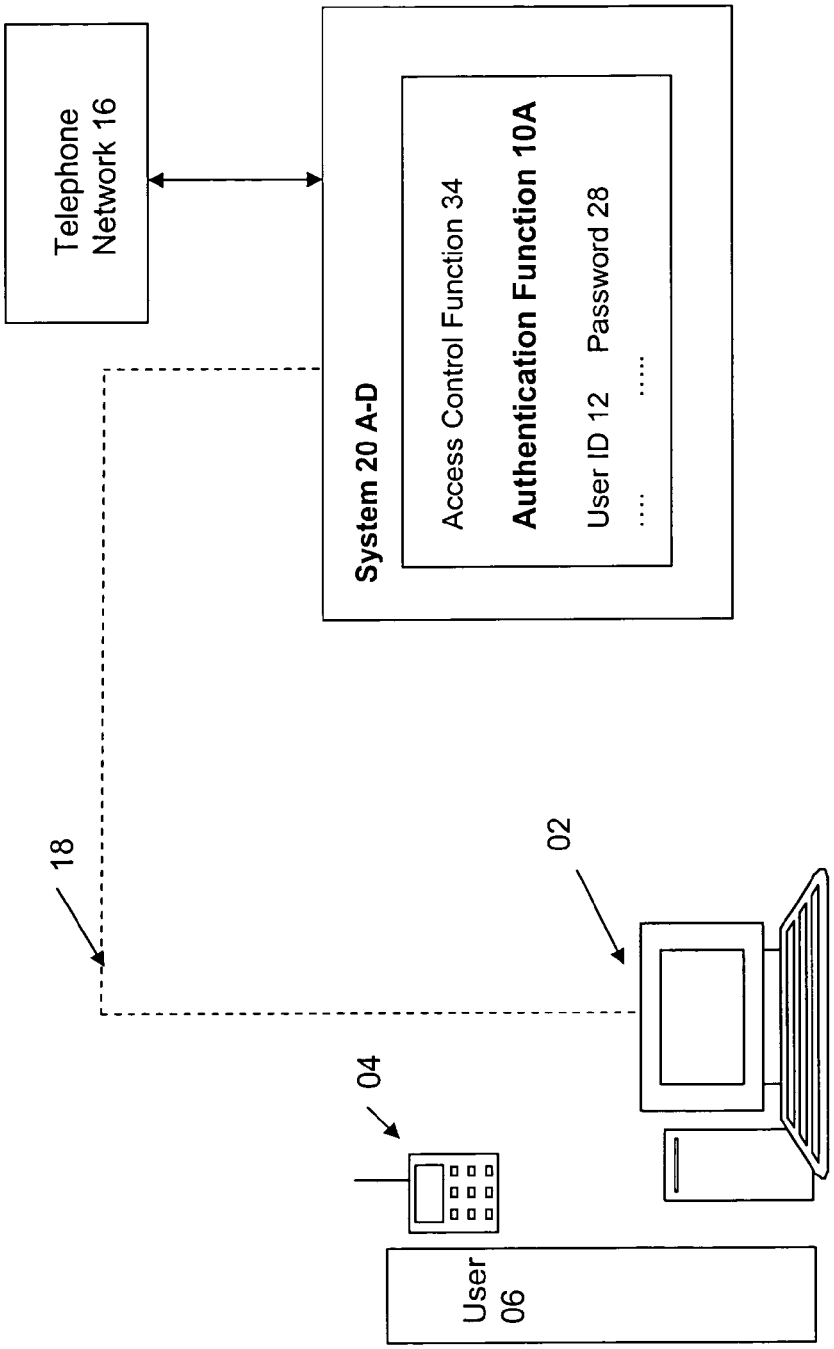
FIG. 1B is a block diagram that illustrates another version of the current invention.

Alternatively, the authentication system 10 functions may be embedded in the system 20A-D itself, such that the user is able to retrieve the password for that particular system. With reference to FIG. 1B, authentication system 10 functions may be embedded in the system 20 itself as authentication function 10A, as part of the system 20 A-D's existing access control function 34, which maintains user ID 12 and password 28.

In a first embodiment with stored passwords, the invention enables storing user's passwords of system 20 A-D in an authentication system 10, from where they can be retrieved by the user 06, when forgotten, through use of a cell phone 04.

In a second embodiment with transient pass codes, the authentication system 10, on request of a user 06 via a cell phone 04, creates in real time a random transient pass code for use for a limited time. The authentication system 10 communicates the transient pass code to the user 06 via voice response on the cell phone 04. The authentication system 10 also communicates the transient pass code to the specific system 20 to which the user 06 wishes to gain access.

A cell telephone 04 to call the authentication system 10 is used because a cell telephone: (i) is a personal item in the personal physical control of the owner, (ii) uniquely identifies the owner, an entity independent of the owner, the telephone company has verified the owner identity, (iii) provides caller ID which cannot be tampered or altered by a user as the caller ID is provided by the telephone company computer systems, further more the caller ID cannot be blocked when calling an 800 number (iv) due to it's convenience and affordable pricing are used by almost every body, and (v) have a minimal risk of theft as the location of a cell phone can be traced by the telephone company. However, fixed telephones as in a home may also be used.

These embodiments are described herein. The headings are provided for the convenience of the reader.

Embodiment with Stored Passwords

The user 06 makes a secure Internet connection to the authentication system 10 (not shown), which provides a web page 400 as illustrated in FIG. 4. The web page 400 allows the user 06 to create or access the user's account in the authentication system 10. The data required on web page 400 is cell tel number 350, name 352, e-mail 354 and PIN 356.

The web page 410, displayed in response to completing web page 400 data entries, allows the user 06 to enter the system 20 names 366 and corresponding passwords 364. The user can enter multiple system names and passwords. The data so entered is saved in the authentication system 10, described later with respect to FIG. 3.

Subsequently, with reference to FIG. 2, if the user 06 when logging on a system 20A-D with a login web page 210, which requires a user ID 12 and a password 28, has forgotten the password, the legend 216 advises the user to call an 800 number to retrieve the password.

When the user 06 calls the authentication system 10 using his/her cell phone 04, the authentication system 10 verifies the caller ID as telephone number 350 and prompts for the PIN 356 and the name of the system 366, asking the user to enter PIN 356 and select the system 20, if the user has stored a password for more than one system. The authentication system 10 then voice responds with the password 364 of the selected system. The voice response technology such as being able to annunciate alphanumeric digits is prior art that is in common use in telephone and banking systems.

Embodiment with Transient Pass Code

The user 06 makes a secure Internet connection to the authentication system 10 (not shown), which provides a web page 400 as illustrated in FIG. 4, The web page 400 allows the user 06 to create or access the user account in the authentication system 10. The data required on web page 400 is cell tel number 350, name 352, e-mail 354 and PIN 356.

The web page 420, displayed in response to completing the data in web page 400, provides a list of systems 20A-D with which the authentication system 10 has a prior established interface. The page 420 displays a list of such systems by system ID 358 and system name 366.

The web page 420, allows the user 06 to select the systems where he/she has an account 422 and for each such system to enter the corresponding user ID 360 and set time 362 for the transient pass code. As an illustration, the user 06 has selected three systems Bank Acme 414A, DMV 414B and Shop NWRK 414C. These selections are identified as 1, 2 and 3 as system ID 422. The data so entered in page 420 is saved in the authentication system 10, described later with respect to FIG. 3.

User 06 opens the authentication system 10 account via a secure Internet connection. To eliminate the possibility of fraud where some one else may open the user account with access to user data, the authentication system 10 verifies the user identity. This verification of user identity may include one or more steps such as, calling the user on the cell phone number to verify the user has the cell phone number and contacting the telephone company and verifying that the cell phone owner name matches that provided by the user.

The steps required to use the authentication system 10, as highlighted in FIG. 1A by encircled numerals are:

(1) A user 06 calls, on his/her cell phone 04, the authentication system 10. The authentication system has pre-stored system identification and corresponding user identification. The user enters a PIN and identifies the system as 1, 2 or 3.

(2) The authentication system verifies the caller by caller ID and the PIN and creates a time-limited password.

(3) The authentication system communicates the time-limited password to the cell phone via voice response.

(4) The authentication system communicates the time-limited password to the system 20 using the system identification and the user identification.

(5) User accesses the system 20, via a system interface 02, by providing the user identification and the time-limited password. The system then grants access after verifying the user identification and the time-limited password.

(6) The system 20 deletes the time-limited password on occurrence of first access or expiration of a time limit.

Authentication System 10

Figure 3:
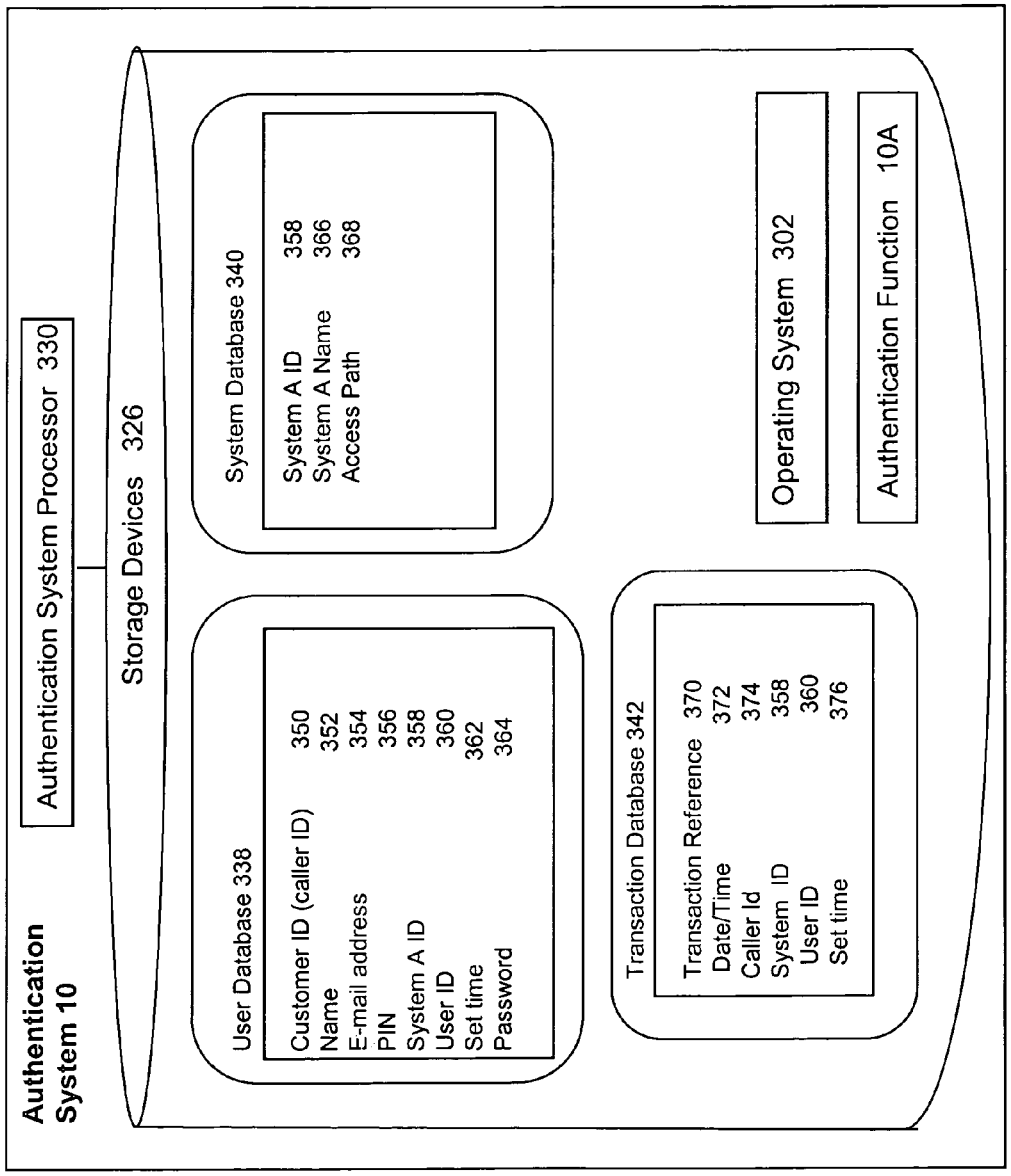
FIG. 3 is a block diagram that illustrates a version of the authentication system.

Referring to FIG. 3, the authentication system 10 includes (i) a storage device 326, (ii) an operating system 302 stored in the storage device 326, (iii) an authentication function program 10A stored in the storage device 326, (iv) and a processor 330 connected to the storage device 326.

The processor 330 can include one or more conventional CPU's. The processor 330 can be capable of high volume processing and database searches.

The authentication system storage device 326 can, for example, include one or more magnetic disk drives, magnetic tape drives, optical storage units, CD-ROM drives and/or flash memory. The storage device 326 also contains a plurality of databases used in the processing of transactions pursuant to the present invention. For example, as illustrated in FIG. 3, the storage device 326 can include a system database 340, a customer database 338 and a transaction database 342.

The authentication system 10 includes a system network interface (not shown) that allows the authentication system 10 to communicate with the user 06. Conventional internal or external modems may serve as the system network interface. In one embodiment, the system network interface is connected to the user interface 02 on a global network 18.

The authentication system 10 also includes a system network interface (not shown) that allows the authentication system 10 to communicate with the telephone network 16 to receive and respond to telephone calls from the user 06.

The authentication system 10 also includes a system network interface (not shown) that allows the computer 10 to communicate with systems 20 A-D. Conventional internal or external modems may serve as the system network interface. In one embodiment, the system network interface is connected to the system 20 A-D on a global network 18.

The processor 330 is operative with the authentication function 10A to perform a customer interface function, a password function, and a system interface function. These are described later in the specification.

Databases 338-342

With reference to FIG. 3, the databases in the authentication system 10 are described.

The customer database 338 within the authentication system 10 contains data specifically related to the user 06 that is transferred to the system 10 from the user. The private data related to the user 06 is caller ID 350, name 352, e-mail address 354, PIN 356, system A ID 358 and corresponding user ID 360, and set time 362 or the password 364.

The system database 340 identifies the information on the system 20, which needs to be accessed by the authentication system 10 to send the transient passwords. The Information may include system ID 358, system name 366, and system access path 368.

This transaction database 342 logs all password request transactions by a transaction reference 370, date/time 372, caller ID 374, and system ID 358. In addition user ID 360 and set time 376 are also maintained for the embodiment that enables sending a transient pass code to system 20.

Authentication System Function 10A

As described earlier, the authentication function 10A is operative with the processor 330 to provide the functions of (i) customer interface function, (ii) password function, and (iii) system interface function.

The customer interface function performs the tasks of (i) opening an account via web page 400, (ii) receiving user id, system id, and set time via web page 420 or receiving system name and password via web page 410, (iii) receiving an 800 call, verifying caller id, and (iv) delivering a voice/text response transient password or a stored password.

In addition to caller id, a PIN 356 may be utilized to verify the caller to the authentication system 10. Use of a PIN is the prevalent technology, for example in gaining access to banking services and voice mail messages.

The password function performs the tasks of (i) creating a random transient password, (ii) alerting the system interface function to send user ID and the transient password, (iii) set a timer for set time, and (iv) at the expiration of the timer alerting the system interface function to send user ID and a null password.

The transient passwords are randomly created by the password function using a prior art random number generator. The transient passwords may be very simple. For example, they may be a two to four digit numerals, making them easy to receive and use by the user.

Transient passwords do not permanently reside anywhere, including the authentication system 10 or even the computer system 20 beyond their transient life. The transient life may be selected by the user based on his/her personal habits in how long does it take them to log on to the system after they have requested a transient password. User specifies the set time at the time of pre-storing the user ID in the authentication system 10 via web page 420. The set time may be specified from a group of 15 seconds, 30 seconds, 45 seconds, 60 seconds, one hour, one day, one month, and three month. The set time is based on user habits and the security needs of the system 20.

The system interface function performs the tasks of (i) interfacing with the system 20, and (ii) sending user ID and the transient password to the system 20. The system interface function may use a special connect path to obtain access to the access control function 34 of the system 20.

The system interface function enables a privileged and secure connection to the system 20 that allows the access control function 34 in the system 20 to receive from the authentication system 10, the user ID 12 and transient password 14. The system interface connection may be via the Internet or it may be a dedicated telephone line connection.

The system interface function sends to the system 20, a user's pre-stored user ID and the random pass code created on user demand. The access control function in the system 20 updates the existing password by the pass code. Subsequently, after waiting a set time, the system interface function sends the same pre-stored user ID and a null pass code to the system 20. The system 20 updates the password by the null pass code, ending the life of the pass code.

Alternate Versions

This invention may be practiced in different versions, as the systems have different security needs and the users have different habits. The access control function 34 of system 20 may have different versions allowing flexibility in how the passwords and pass codes are used.

In one version, the authentication system 10 sends the user ID, the transient pass code and the set time all at the same time, avoiding a second or subsequent data interface to system 20. In this version the access control function 34 of the system 20, would run its own timer and after expiry of set time would disable the transient pass code. The access control function 34 may disable the transient pass code either upon first access or after set time expires.

In other versions the access control function 34 may be able to use either an existing password or a transient pass code. Three different versions are described here.

In the first version a system may require only the transient pass code for gaining access to system 20. In the second version either the traditional password OR the transient pass code may be used by the user to gain access to the system 20. The access control function 34 is adapted to recognize, either the traditional password or the transient pass code as valid user verification, enabling those users who do not see a need to adopt the transient pass code, to continue to use the traditional password and those users who want to use the transient pass code, to also do so. In the third version both the traditional password AND the transient pass code may be required to gain access, as may be used in very high security systems.

With reference to FIG. 2, log on web pages for some of the different versions are illustrated. Log in page 210 requires the use of an existing password 14. User instructions 216 describe how the password is obtained by calling an 800 number using the user's cell phone. Log in page 220 requires the use of a transient pass code, as instructions 226 describes this feature of the log on procedure.

In yet another version, the password is in the form of a passkey. The passkey has embedded user identification and a random pass code. The passkey is sufficient both to identify the user and to verify the user to the system.

As an illustration, take a banking application, where the bank computer system already has ability to respond to telephone calls by their customers, as well as to provide web-based online banking services, where a user ID and password is required, the user ID being in many cases a social security number.

According to this invention, a user before logging on to the online bank system would call an 800 number of the bank. The bank would verify the caller ID with either the user home number or the cell telephone number, and request the PIN code, the same PIN code for an ATM card. On customer identification and verification, the authentication function 10A in the bank computer system 20 would generate a random number and append it to the user telephone number making it a passkey, send it to the user on the telephone, and send it to the access control function 34 of the system 20.

In this version, there is no need for the user to open an account as with other versions described earlier because the banking system already has the data on the user of telephone number, name, e-mail address and the PIN.

As illustrated in FIG. 2, log-in-page 230, the user would log on with a passkey 29 as one string, eliminating the user ID and password data entry fields. The access control function 34 would both identify the user 06 and verify the user with the passkey 29.

As further illustration of this version, a user has a cell telephone number of 1-707 399 4333 and calls 1-800 Bank One. The bank system asks for a PIN and the user enters a PIN of 1249, the same PIN used for an ATM or the last four digits of social security number. The authentication function 10A in the bank computer system identifies and verifies the user and creates a passkey of 7073994333-4345, where the first number is the cell telephone number and the last four digits are a random number created for this user for this transaction. The authentication function 10A communicates the passkey of 7073994333-4345 to the access control function 34. The authentication function 10A also communicates the passkey to the user 06. Since the user already knows the telephone number, there is no need to communicate that part of the passkey. Therefore the voice response may be "plus 3445. A time limit for which this passkey is useable may also be voice annunciated such as "plus3445 three minutes".

The user, on login page 230, enters passkey 29 as 7073994333-4345. Legend 236 describes to the user how to obtain the passkey 29. The bank identifies the user 06 by the telephone number 707 399 4333 and verifies the user 06 by the random code of 4345, and grants access for one time or for a time limit of three minutes.

This, it is believed, is far more secure and convenient for the bank customer and the bank. It enables the bank customer: (i) to not have to have a password to remember and safeguard, (ii) to not have to use a social security number as user ID to access the account, (iii) to not need additional resources as the user already has a cell phone or home phone with unique phone numbers and (iv) to not have to learn new procedure as the user is already familiar with the procedure of using an 800 number call to bank and a voice response.

To the bank it provides: (i) not having to implement a new system other than the authentication function software 10A in their existing bank computer system 20, (2) security for the bank, as a transaction log is created for each request for a passkey and a random number is embedded in each passkey, and (3) additional security as the use of a passkey may be limited for a single transaction and/or for a set time, and the user may be so advised when the passkey is voice response delivered.

Figure 1C:
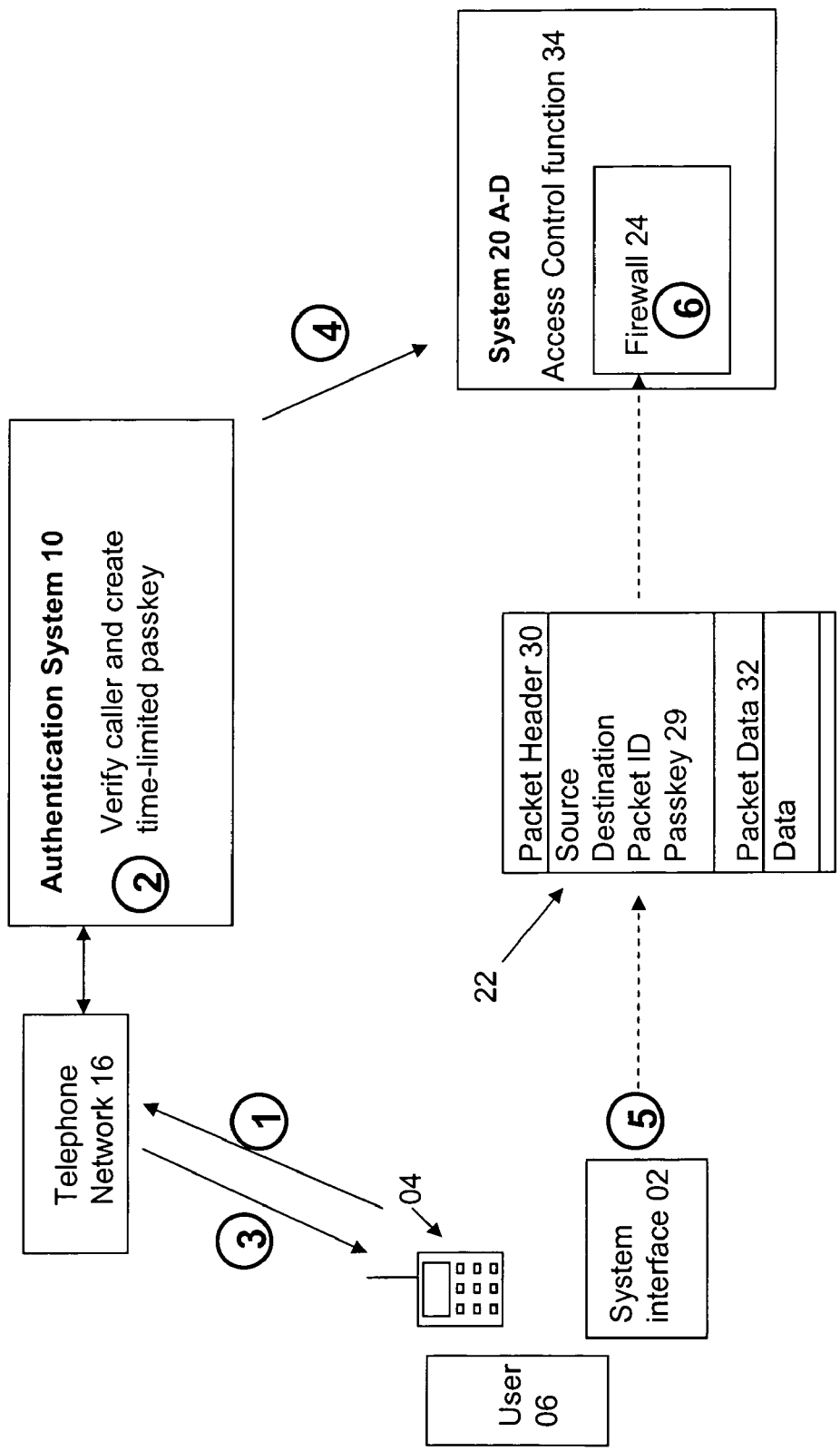
FIG. 1C is a block diagram that illustrates yet another version of the current invention.

Another version of this invention is illustrated with reference to FIG. 1C. The system 20 has a firewall 24, which screens all data packets 22 of information coming in from system interface 02 over the Internet. A packet 22 has a packet header 30 and packet data 32.

The system interface 02 is adapted to embed the passkey 29 as part of each packet header 30. The passkey 29 may be included in the source field of the packet header 30, without the need to create a new field for the passkey 29. The access control function 34 of the system 20 copies the passkey to the firewall 24. The firewall 24 stores this passkey and uses it to compare with the passkey of the data packets as they arrive. The software/firmware in the firewall 24 is adapted to discard those packets 22 that either do not have a passkey 29 or the passkey does not match the passkey that is stored in the firewall 24.

The advantage of this version is that the user access that has been not authenticated by the authentication system 10 is blocked at the firewall 24 of the system 20.

In summary, the authentication system 10 allows the user to create and use transient pass codes or use his/her existing passwords when accessing the computer systems 20A-D where he/she has accounts accessible by a user ID and a password. The transient pass codes are simple, easily created immediately prior to the time of gaining access to a computer system, and have a short transient life, thus eliminating many of the problems in using passwords, as described earlier in this specification.

While the particular method and apparatus as illustrated herein and disclosed in detail is fully capable of obtaining the objective and providing the advantages herein before stated, it is to be understood that it is merely illustrative of the presently preferred embodiments of the invention and that no limitations are intended to the details of construction or design herein shown other than as described in the appended claims.

The invention claimed is:

1. A method of using a password in a password access controlled system comprising the steps of:
 a. receiving by an authentication system a call from a cellular phone with a cellular telephone company provided caller ID, and the authentication system identifying a caller by matching the telephone company provided caller ID, which has been pre-stored in an authentication database;
 b. subsequent to step (a), on a prompt from the authentication system, receiving an input of a personal identification number and the authentication system verifying caller identification, by matching the personal identification number, which has been pre-stored in the authentication database;

c. subsequent to step (b), on a prompt from the authentication system, receiving an input for selecting a system from one of a plurality of password access controlled systems that have been pre-stored by the caller and for which a pass code is desired;

d. the authentication system creating a randomly generated pass code for the selected system; and contemporaneously voice responding to the caller and sending the pass code and a pre-stored user ID to the password access controlled system enabling the system to accept the pass code in lieu of an existing password.

2. The method as in claim 1, comprising the steps of:
sending a null pass code and the pre-stored user id, after waiting a set time, to the password access controlled system enabling the system to null pass code, thereby ending the life of the pass code.

3. The method as in claim 1, comprising the step of:
contemporaneously sending to the password access controlled system the set time for which the pass code is good for.

4. The method as in claim 3, comprising the step of:
specifying the set time from a group of 15 seconds, 30 seconds, 45 seconds, 60 seconds, one hour, one day, one month, and three month.

5. A password storage and retrieval system that facilitates storage and retrieval of passwords to help a user use his/her existing passwords without having to memorize or safeguard them in personal papers, comprising:

a. a password storage server adapted with an interactive voice response system;

b. a function to identify the caller by telephone company provided caller id, and verify the caller with a secret personal number;

c. a function for selecting from one of a plurality of password access controlled systems that have been pre-stored by the caller and for which an existing password retrieval is desired;

d. a function to retrieve the existing password for the selected system from the server and voice deliver to the user by the voice response system.

6. The system as in claim 5, further comprising:

a. an account creation function that creates an account for a user in the server, by confirming the caller id and requesting a first time entry of a secret personal number;

b. a storage function that accepts entry of a plurality of passwords for storage in the server for later retrieval.

7. An authentication system working in conjunction with a password access controlled system, wherein the authentication system comprising:

a. an interactive voice response server adapted with, (i) ability to receive telephone calls from telephone company systems, (ii) interface with an authentication server, (iii) a function to collect telephone company provided caller id and forward to the authentication server, (iv) a function to prompt for and receive a numeric personal number of the caller that is able to be entered on a numeric keypad generating a DTMF tone and forward to the authentication server, (v) a function to prompt for and receive an input identifying one of a plurality of pre-stored password access controlled systems and a function that voice delivers to a caller, a random pass code that is received from the authentication server for the system;

b. an authentication server adapted with, (i) a function to interface with the voice server, (ii) a database that pre-stores telephone company provided caller id information and a secret personal number of the callers, (iii) a function that can identify the callers by comparing a caller id pre-stored in the database, (iv) a function that can verify the callers by the pre-stored secret number, (v) a function that generates the random pass code and stores it for use by the password access controlled system, (vi) and a function that communicates the random pass code to the voice response server.

8. A method of user authentication to a plurality of password controlled access systems (systems-to-be-accessed), where the user may have access to different systems-to-be-accessed such as, online banking, financial/stock, shopping, and work using a combination of user id and static password, comprising the steps of:

a. receiving a call originating from a cell phone by an authentication system with pre-stored caller identification, caller verification data, systems-to-be-accessed data and their corresponding user identification;

b. receiving a personal secret number subsequent to caller identification via telephone company provided caller id and on getting a prompt;

c. prompting for and receiving a selection of a systems-to-be-accessed from one of pre-stored systems-to-be-accessed identifications;

d. creating a randomly generated time-limited pass code, by the authentication system;

e. communicating contemporaneously the time-limited pass code (i) to the cell phone via voice response, and (ii) to the specific system using the systems-to-be-accessed identification and the user identification.

9. The method as in claim 8, further comprising the steps of:

a. updating by the specific systems-to-be-accessed on receiving the user id and time-limited pass code, its access control database with the just received pass code;

b. the specific system detecting the entry of a pass code or a password, deleting, the time-limited pass code on occurrence of a first access to the system or on expiry of a preset time limit.

10. The method as in claim 8, the step (c) comprising further step of:
receiving a selection input for the specific system from a group of, customer bank on-line computer system, employer's business system, consumer resource system, and facility access system.

11. The method as in claim 9, further comprising step of:

a. enabling using a system interface from a group of, a point of sale terminal at a merchant, an automated teller machine, a personal computer system, and a facility access control system;

b. enabling using, via a systems-to-be-accessed interface specific to the system, to access the system with one of steps of, (i) the user identification and the time-limited pass code (ii) caller id and time-limited pass code, (iii) user id and an existing static password.

12. An authentication system to authenticate a user to a System (system to be accessed) comprising:

a. a first function that enables the authentication system to receive communication from a cell phone of the user via a telephone call and verify the user by a combination of a pre-stored caller id, generated by the telephone company itself and entry of a secret personal number by the user in the cell phone, also pre-stored in the authentication system database;

b. a second function that enables the authentication system to create a randomly generated alphanumeric passkey and associate a time-limit for its use that has been selected by the user;
c. a third function that enables the authentication system to communicate in real time the passkey to the user via the cell phone, along with the time limit;
d. a fourth function that enables the authentication system to communicate the passkey and the time limit to the System, whereby enabling the System to grant access to the user by use of the passkey and discarding the passkey on first access or on expiration of time limit.

13. The authentication system as in claim 12, further comprising:
   wherein the passkey being sufficient to both identity and verify the user to the system, wherein the passkey embedding within the passkey a unique user identification.

14. The authentication system as in claim 13, wherein the passkey comprising:
   the unique user identification is the user cell telephone number.

\* \* \* \* \*